UNITED STATES PATENT OFFICE.

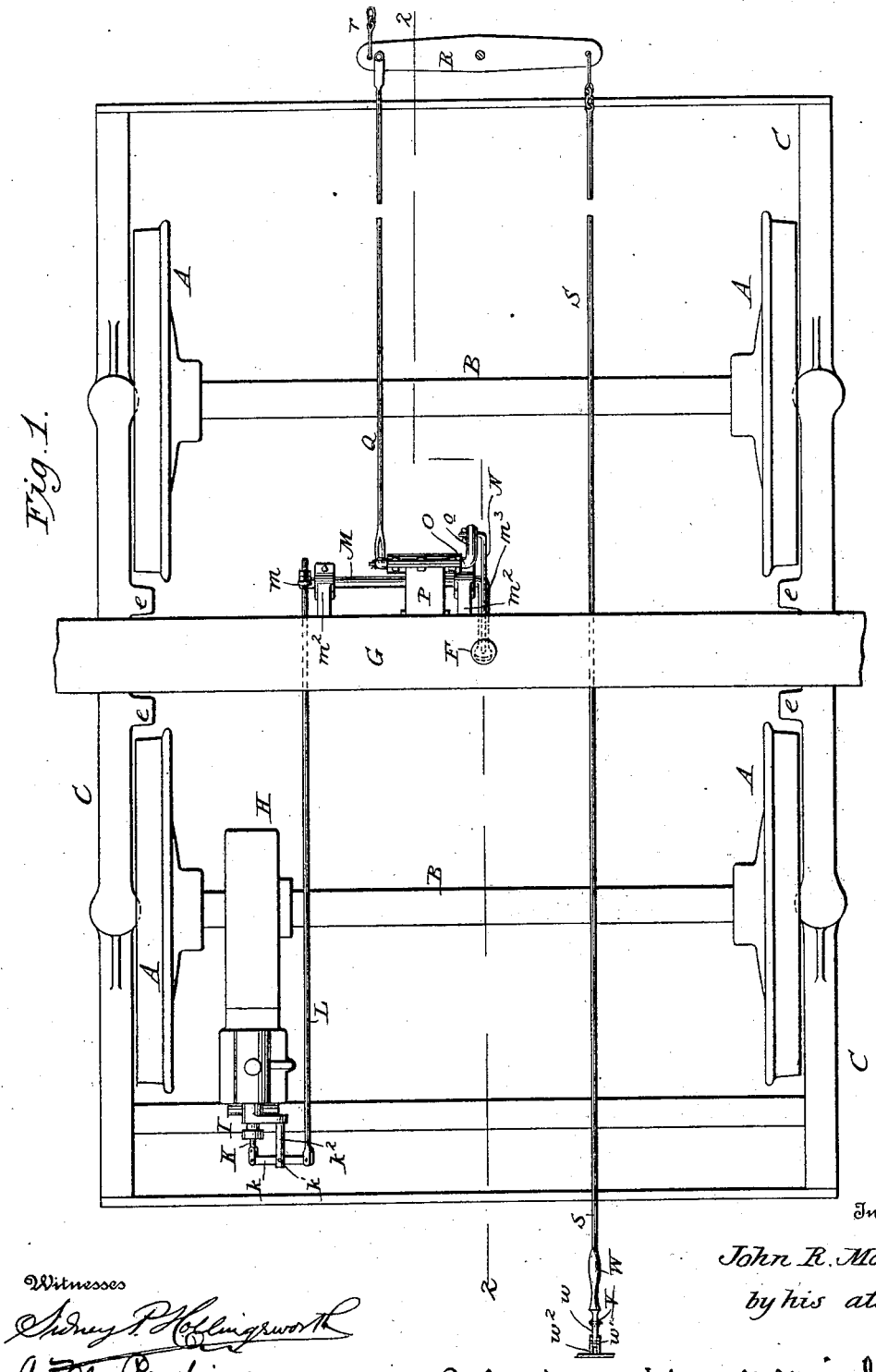

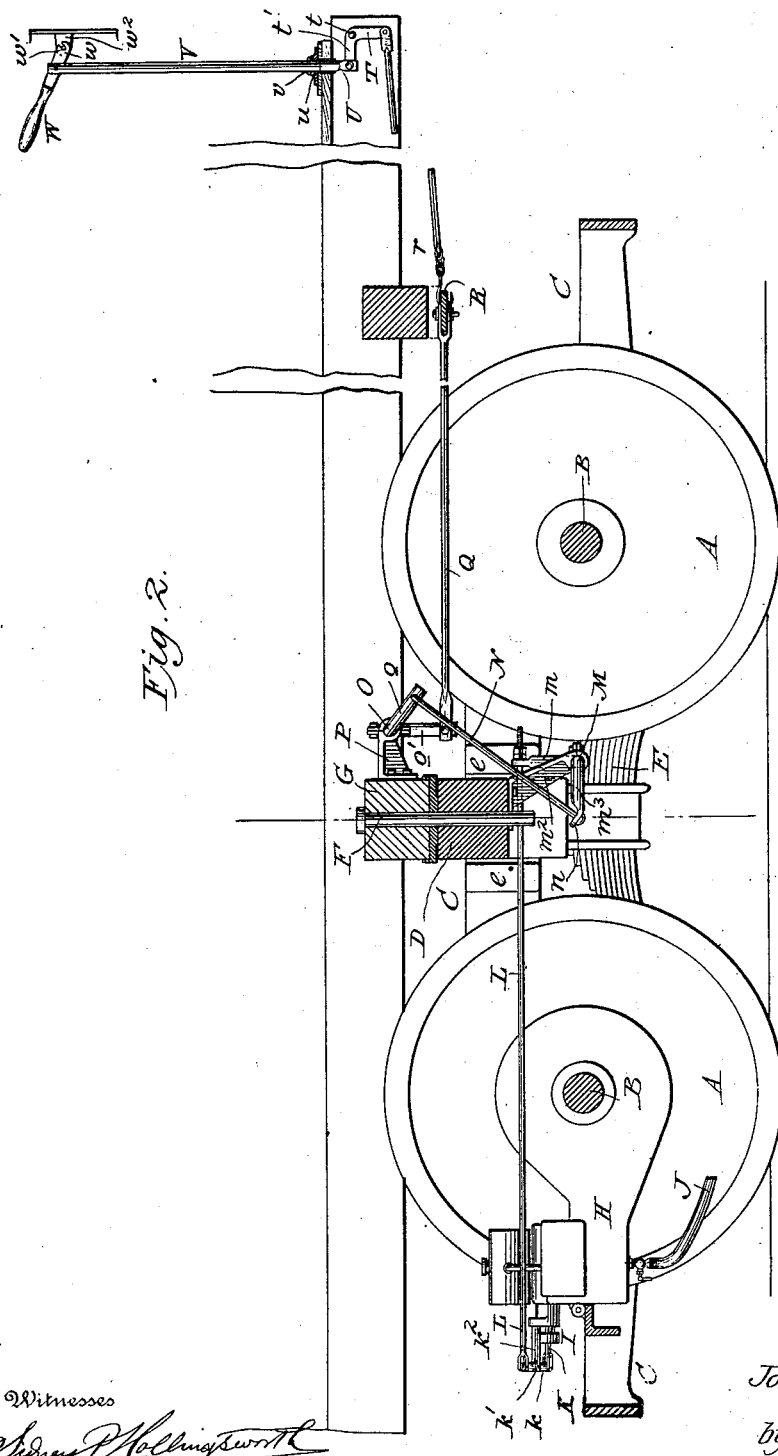
No. 705,946. Patented July 29, 1902.
J. R. MONTAGUE.
CAR BRAKE.
(Application filed Oct. 16, 1901.)
(No Model.) 2 Sheets—Sheet 2.

JOHN RICHARD MONTAGUE, OF SYRACUSE, NEW YORK, ASSIGNOR TO HYDRAULIC CAR-BRAKE COMPANY, OF SYRACUSE, NEW YORK, A CORPORATION OF NEW YORK.

CAR-BRAKE.

SPECIFICATION forming part of Letters Patent No. 705,946, dated July 29, 1902.

Application filed October 16, 1901. Serial No. 78,807. (No model.)

*To all whom it may concern:*

Be it known that I, JOHN RICHARD MONTAGUE, a citizen of the United States, residing at Syracuse, in the county of Onondaga and State of New York, have invented certain new and useful Improvements in Car-Brakes, of which the following is a specification.

My invention more especially relates to brakes especially adapted for cars having trucks at each end and which are pivoted or swiveled to turn relatively to the car-body when rounding curves.

The object of my invention is to provide mechanism controlling the operation of the brakes of such construction and organization that it shall be under the control of the motorman or attendant at all times, whether the car be running straight ahead or rounding a curve, and shall not be affected by other varying movements of the car, but only put in action at the will of the attendant.

In carrying out my invention I provide a jointed or flexible connection between the brake-applying mechanism and the brake-controlling mechanism, which is in line with the axis about which the truck turns, the construction and organization being such that while the brake-applying mechanism may be put in operation at any time, whether the car be running straight ahead, backing, or rounding a curve, it cannot be improperly operated by any straining of the mechanism due to the turning or other movement of the truck relatively to the car-body.

My improvements may be applied to brake mechanisms of various kinds. I do not, therefore, wish to be limited to any special embodiment of my invention.

In the accompanying drawings I have shown one way in which my improvements may be applied.

Figure 1 is a plan view of so much of a truck at one end of a car as is necessary to show the manner in which my improvements may be used. Fig. 2 shows a longitudinal central section thereof on the line 2 2 of Fig. 1.

The wheels A, with their axles B, are mounted in a truck-frame C. A bolster D, supported on springs E, is free to move vertically in guides $e$ in the frame and is connected by the pivot-bolt F with a cross-beam G, secured to the car-body. These before-mentioned parts are of well-known construction, and further description of them is unnecessary. They may be of other construction, as my invention is applicable to all kinds of swiveled trucks.

In the drawings I have shown fluid mechanism for operating the brakes. The construction and operation of such mechanism is well known, and I therefore deem it unnecessary to show such mechanism in detail, but only so much of it as is necessary to show how my improvements may be applied to such mechanism.

H indicates a pump supported on one of the axles and having valve mechanism I. The pump may be connected by the pipe J with a brake-cylinder, which may operate the brake-shoes in any suitable way. The valve-rod K is connected at its outer end with one end of a lever $k$, fulcrumed at $k'$ to a bracket $k^2$ and connected at its opposite end with one end of a rod L, which extends longitudinally under the car and is connected at its opposite end with an arm $m$, extending upwardly from a transverse horizontally-arranged rock-shaft M, mounted in bearings arranged in brackets $m^2$, secured to and depending from the bolster D. The shaft is arranged a short distance in front or in rear of the axis of the pivot-bolt F, and it carries an arm $m^3$, projecting horizontally toward the axis of the bolt in the longitudinal central line of the truck. This arm terminates immediately under the bolt, and it is there provided with an eye $n$, into which projects the lower end of an upwardly-inclined rod N, also arranged in line with the longitudinal axis of the truck and having jointed connection with an arm $o$, projecting laterally from a horizontally-arranged rock-shaft O, mounted in bearings in brackets P, projecting from the transverse beam G of the car-body. This rock-shaft O is provided at its opposite end with a downwardly-projecting arm $o'$, flexibly connected with one end of a rod Q, the opposite end of which is connected with one end of a lever R, pivoted to some part of the car-body, as shown in Fig. 2, and having its opposite end connected with a rod S, which extends to the mechanism at the end of the car which is directly operated by the motorman or attendant. The lever R may also be connected to the opposite end of the car by means of well-known devices, (indicated at $r$ in Fig. 1.)

The means for actuating the rod S may be of any suitable construction. As shown, the rod is jointed to a bell-crank lever T, pivoted at $t$ to the car-body and having an arm $t'$, jointed to a vertically-moving block U, which slides in a socket $u$ in the car-frame. V indicates a rod which is adapted to slide vertically in a guide $v$ and which is pivotally connected at its upper end with a hand-lever W, having a forked end $w$, adapted to engage with a pin $w'$, carried by brackets $w^2$, secured to the car-frame. By pressing downwardly on the handle the rod V may be made to depress the block U, and thus operate the rod S; but the lever W may be readily disengaged from its fulcrum, and the rod V may be lifted out of its guide or socket. When the rod V is removed, the brakes cannot be accidentally operated. It will be observed that the eye $n$ is located directly under the axis of the pivot-bolt F and that the connections are such that even though the car sways relatively to the truck or the truck moves in any direction relatively to the car the operating-rods are not moved or put under tension in such manner as to in any way move the valves which control the movement of the fluid that operates the brakes, and the connections are never put under such strain that the attendant cannot easily actuate the mechanism to apply or release the brakes. These advantages are mainly due to the fact that a portion of the mechanism is located close to the axis about which the truck moves relatively to the car-body, and it is obvious that such mechanism may be connected not only with valves for controlling the movement of fluid for operating brake mechanism, but may also be connected with other mechanism for applying brakes. I have merely shown one way in which my improvements may be used.

That part of the mechanism which I call the "brake-applying" mechanism is connected to that part which I call the "brake-controlling" mechanism at the point $n$.

I claim as my invention—

1. The combination of a car-body, a car-truck pivotally connected therewith; brake-applying mechanism supported by the car-truck and brake-controlling mechanism flexibly connected with the brake-applying mechanism below and in line with the axis about which the truck moves relatively to the car-body.

2. The combination of a car-body; a car-truck pivotally connected therewith, brake-applying mechanism, a rocking lever connected with said brake mechanism, another rocking lever, means for operating it, and connections between the two rocking levers having a pivot in line with the axis about which the truck moves relatively to the car-body.

3. The combination of a car-body, a car-truck pivotally connected therewith, fluid-pressure brake mechanism, a valve-operating rod connected therewith, a rocking lever connected with said valve-rod, another rocking lever, means for operating it and connections between the two rocking levers having a pivot in line with and below the axis about which the car turns.

4. The combination of a car-body, a truck pivotally connected therewith, two rock-shafts, a rod connecting said rock-shafts and having a jointed connection with one of them in line with the axis about which the truck turns relatively to the car-body, means for connecting the brake-operating mechanism with one of said rock-shafts and devices under the control of the attendant for moving the other rock-shaft.

5. The combination of a car-body, a car-truck pivotally connected therewith, two rock-shafts, a rod connecting the rock-shafts and having a jointed connection with one of them in line with the axis about which the truck turns, valve mechanism, means connecting one of the rock-shafts with said valve mechanism, brake-controlling mechanism, and means connecting said mechanism with the other of said rock-shafts.

6. The combination of a car-body, a car-truck pivotally connected therewith, the upper rock-shaft having laterally-projecting arms, the lower rock-shaft also having laterally-projecting arms, a rod connected to arms on the two rock-shafts and having a jointed connection with the lower rock-shaft in line with the axis about which the truck turns relatively to the car-body, connections leading from the other arm on the lower rock-shaft to the brake-applying mechanism and connections leading from the other arm on the upper rock-shaft to the brake-controlling mechanism.

In testimony whereof I have hereunto subscribed my name.

JOHN RICHARD MONTAGUE.

Witnesses:
N. J. LINDENMEYER,
G. A. COWLES.